*J. Wallace,*
*Oscillating Steam Engine.*
No. 17,903.   Patented July 28, 1857.
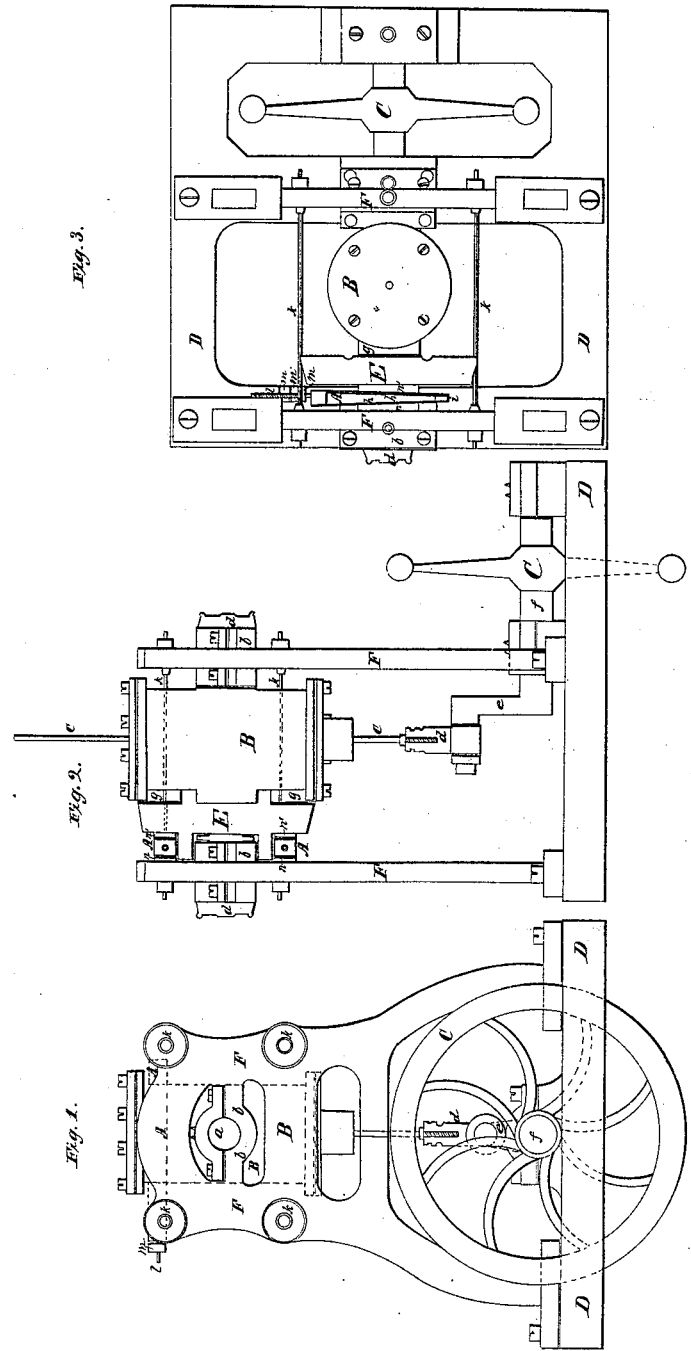

UNITED STATES PATENT OFFICE.

JOHN WALLACE, OF PITTSBURGH, PENNSYLVANIA.

OSCILLATING STEAM-ENGINE.

Specification of Letters Patent No. 17,903, dated July 28, 1857.

*To all whom it may concern:*

Be it known that I, JOHN WALLACE, of Pittsburgh, in the county of Allegheny and State of Pennsylvania, have invented a new and useful Improvement in Oscillating Steam-Engines; and I hereby declare that the following is a full, clear, and exact description of the construction and operation of the same, reference being had to the annexed drawings, making a part of this specification, in which—

Figure 1 is a face view of the engine; Fig. 2 a side view of the same; and Fig. 3 a top view or ground view.

The engine herein represented is of that class of oscillating steam engines which are commonly termed "side pipe engines," in which a stationary valve or side pipe is used for the distribution of the steam in the cylinder, the same being kept up against the steam port or valve seat surfaces on the cylinder, and the oscillations of the latter bringing the steam port openings in the cylinder into or out of communication with the respective openings in the side pipe for the admission or escape of the steam. And my improvement has only reference to this class of engines.

The nature of my improvement consists in the mode of keeping up the said side pipe against its respective seat surfaces on the cylinder, by means of elastic wedges (in place of set screws, gib and key and other non-yielding or inelastic means, that had been heretofore used), for the purpose of allowing the side pipe to yield in accordance to the expansion and contraction of the metal of the cylinder and side pipes caused by variations in their temperature.

To set forth my invention more fully, I will proceed to describe the accompanying drawings.

In all the figures the same letters of reference are marked on like parts.

The framework of the engine consists of the bed plate D and the uprights or stands F, F, which are connected together by the stay rods $k, k$.

B, is the cylinder; $a$ the trunnions of the same resting in the bearings $b\ b$.

$c$ is the piston rod, $d$ its head, $e$ the crank, $f$ the main or engine shaft, and C the fly wheel.

E represents the side pipe or stationary valve; $g, g$, its seat surfaces on the cylinder; the steam openings in the side pipe and seat surfaces for the distribution of the steam in the cylinder (*i. e.* for admission and escape) are made and arranged in the usual and well known manner, and are therefore not represented in the present drawings, the steam enters on one side of the side pipe and escapes through the other side.

A, A, are two elastic wedges, by means of which the side pipe is kept up steam tight against the seat surfaces $g, g;$ each one of the wedges is composed of two steel plates $h, h$, which are kept separated so as to form a taper by the end blocks $i, i$, to which they are firmly connected by rivets, bolts or other suitable means.

$l, l$, are screw bolts firmly connected with the wedges, and passing through eyes, provided in the rods $k, k$.

$m, m$, are nuts and counter or jam nuts on the bolts $l$, by which the wedges are secured in their position, and whereby the same can be properly adjusted.

$n, n$, are projections on the frame, which are of a tapering form, corresponding to the taper of the wedges A, A; $n', n'$, are similar projections on the side pipe; between these projections $n, n'$, the elastic wedges are placed.

When the engine is operating, the side pipe is required to be kept up against its seat surfaces on the cylinder, with a certain degree of pressure, which must be sufficient to counteract the back action of the steam against the side pipe, and to insure the steam tightness of the surfaces, sliding on each other; this has heretofore been done in various ways and by different means; thus by means of a counter nut in the center of the side pipe, or by set screws, or gib and keys acting against the side pipe; but all these means differ distinctly and in an essential point from the above described wedges A, A, viz, the former means being all rigid, allowing no yield to the side pipe, when the spring wedges are elastic. This is of great practical importance.

All changes in the temperature of the cylinder and side pipe cause the metal of those parts to expand or contract, respectively, and if there is no yield allowed to the side pipe, it is obvious that in case of expansion the sliding surfaces will be thrown under a great strain or pressure, causing an immense friction and wear of the same, unless the set screws or gib and key or whatever other rigid means may be used, to act on the side pipe are slackened, so as to relieve the surfaces; and if, on the other hand a contraction of the cylinder and side pipe takes place, in consequence of a decrease of the temperature of the steam in them, the sliding surfaces will come out of a firm contact and steam will leak through between them, so that another adjustment of the side pipe by the above rigid means are required again. Thus a frequent adjusting of the parts and a constant careful attention is required to keep the side pipe properly up against the seat surfaces when rigid means are used, as this has always been done heretofore. Now the object of my improvement, viz: the application of elastic wedges, is to overcome this objection, which in practice is of a most serious nature. By adjusting the spring wedges A A by means of the nuts m, m, so that their elastic power against the side pipe is sufficiently great to keep the same up against the seat surfaces perfectly steam tight, at the time when the steam is under its full pressure, and also at the time when the parts (the cylinder and side pipe) are most contracted, which is at the starting of the engine; the joint between the sliding surfaces will be steam tight under all circumstances and the extension of the parts will have no injurious effect, as the side pipe is allowed by the elasticity of the spring wedges to yield to some degree, without causing an increase of pressure of any consideration between the said surfaces.

I wish it distinctly understood that I disclaim all such means that have been used before for adjusting and keeping up the "side pipe" against the seat surfaces on the cylinder, such as set screws, gib and key, or any other devices which allow no yield to the side pipe; but—

What I do claim as my invention, and desire to secure by Letters Patent, is—

The use of the elastic wedges A, A, in contradistinction to the above mentioned unyielding devices, and as an improvement thereon; when constructed and arranged and operating on the side pipe substantially as described, and for the purpose set forth.

JOHN WALLACE.

Witnesses:
SAMUEL MASON,
AND. M'MASTER.